(No Model.)
D. P. THOMSON.
COMMUTATOR.
No. 534,729.  Patented Feb. 26, 1895.
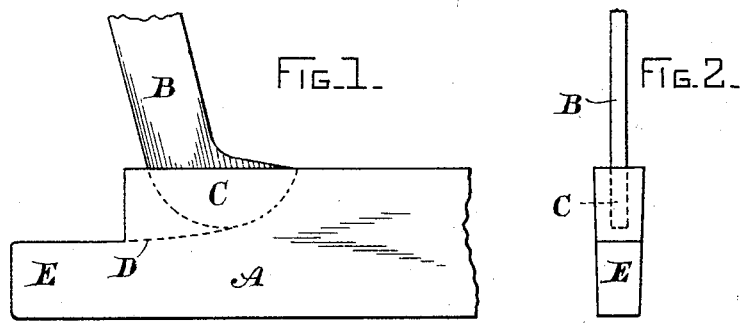
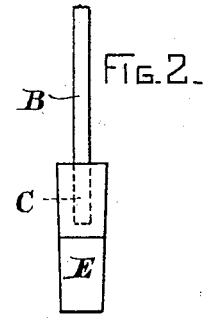
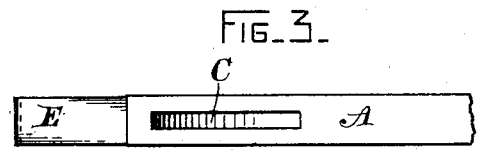
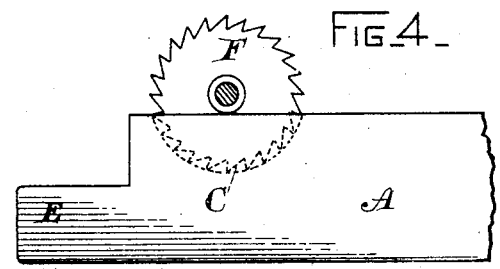
WITNESSES
A. F. Macdonald.
B. B. Hill.
INVENTOR
David P. Thomson
by
Geo. R. Blodgett,
atty.

United States Patent Office.

DAVID P. THOMSON, OF SCHENECTADY, NEW YORK, ASSIGNOR TO THE THOMSON-HOUSTON ELECTRIC COMPANY, OF BOSTON, MASSACHUSETTS.

COMMUTATOR.

SPECIFICATION forming part of Letters Patent No. 534,729, dated February 26, 1895.

Application filed December 17, 1894. Serial No. 532,013. (No model.)

*To all whom it may concern:*

Be it known that I, DAVID P. THOMSON, a citizen of the United States, residing at Schenectady, in the county of Schenectady, State of New York, have invented certain new and useful Improvements in Commutators, of which the following is a specification.

My invention relates to the commutators of dynamo-electric machines, and more particularly to the connections between the commutator segments; and has for its object to provide a means for making such connections, which shall be free from some of the objections inherent in methods now known to me.

In making connections of the class described, it has heretofore been customary in very many types of machine to mill a slot in the commutator segment passing from the top of the segment to the cut-away portion thereof which is embraced by the clamping ring. This construction, however, has been found objectionable, because, when the leads are soldered in place in the slots which are intended to receive them, the heat of the soldering iron often causes the melted solder to run under the insulation of the clamping rings, so that a short circuit is formed from one segment to another. This may even extend across two segments; and in practice it has been found to be so serious an evil that it has necessitated in some cases taking down and reassembling the entire commutator before it was possible to discover where the fault was located, or to properly repair it. This difficulty is caused, as already pointed out, by the fact that the milled slot is cut entirely through the end of the commutator segment; and to obviate it I have devised my improved means of attaching the leads, which consists in passing the milling cutter into the segment for such a distance as to make a groove of semi-circular or equivalent shape in the upper surface of the commutator segment. Solder is then put into this groove and a connector inserted. The part of the copper between the groove and the clamping ring prevents the solder running down to the ring or forming any communication with other segments except where it is in plain sight and may be readily removed.

The accompanying drawings show an embodiment of my invention, Figure 1 being a side elevation of a commutator segment, showing the old method and the new; Fig. 2 being a rear end elevation of the parts shown in Fig. 1; Fig. 3, a plan view of the commutator segment, and Fig. 4 illustrating the method of forming the semi-circular cup or groove.

A is the commutator segment and B is the connector.

C is the semi-circular cup or groove referred to, shown in Fig. 1 in dotted lines.

E is the part of the commutator to which the clamping ring is applied, suitable insulation being of course interposed, all of which is not shown, as it forms no essential part of my invention.

In Fig. 1, at D, I illustrate in dotted lines the shape of the groove which has heretofore been employed, and which is formed by passing the milling cutter along to the end of the bar.

In Fig. 3 I show in plan a commutator segment ready for the insertion of the connector. In Fig. 4 the cutter F is shown in the semi-circular groove C.

The method of operation and utility of my invention have been sufficiently pointed out in the statement thereof.

Where I have employed the word "semi-circular" herein, I do so for convenience only, as it is manifestly immaterial what the shape of the slot C may be, provided it does not touch the end of the commutator bar, but remains as a cup-shaped groove adapted to hold the solder and prevent its short-circuiting the segments.

What I claim as new, and desire to secure by Letters Patent of the United States, is—

1. As a new article of manufacture, a commutator segment for a dynamo-electric machine, having a cut in its upper surface not extending to the end of the segment, and adapted to receive the lead or connector.

2. As a new article of manufacture, a commutator bar having a cup or groove in its upper surface.

3. In combination, a commutator bar having a semi-circular cup or groove in its upper surface, and a connector or lead soldered therein.

In witness whereof I have hereunto set my hand this 15th day of December, 1894.

DAVID P. THOMSON.

Witnesses:
B. B. HULL,
A. F. MACDONALD.